United States Patent [19]

Cisterni

[11] 4,282,120

[45] * Aug. 4, 1981

[54] SHEET MATERIAL FOR GENERAL COVERINGS AND METHOD OF MAKING THE SAME

[75] Inventor: Leandro Cisterni, Forli, Italy

[73] Assignee: S.U.B. Societa Utilizzazione Brevetti S.R.L., Forli, Italy

[ * ] Notice: The portion of the term of this patent subsequent to Sep. 5, 1995, has been disclaimed.

[21] Appl. No.: 872,053

[22] Filed: Jan. 25, 1978

[30] Foreign Application Priority Data

Jan. 31, 1977 [IT] Italy ............................... 19781 A/77

[51] Int. Cl.$^3$ ............................. C08L 1/00; B29D 7/14
[52] U.S. Cl. ............................... 260/17.4 R; 264/175; 264/211; 264/293; 264/349; 428/326
[58] Field of Search .............. 264/122, 175, 133, 211, 264/293, 349; 156/62.2; 260/17.4 GC, 17.4 CL, 17.4 R, 17.5; 425/320; 428/326

[56] References Cited

U.S. PATENT DOCUMENTS

| | | | |
|---|---|---|---|
| 2,543,101 | 2/1951 | Francis | 264/122 |
| 2,790,741 | 4/1957 | Sonneborn et al. | 264/122 |
| 3,101,241 | 8/1963 | McKee | 264/122 |
| 3,114,672 | 12/1963 | Schott | 264/122 |
| 3,287,479 | 11/1966 | Naudain | 264/122 |
| 3,309,444 | 3/1967 | Schueler | 264/122 |
| 3,560,324 | 2/1971 | Quackenbush | 264/122 |
| 3,718,536 | 2/1973 | Downs et al. | 156/62.2 |
| 3,994,845 | 11/1976 | Blachford | 264/175 |
| 4,112,145 | 9/1978 | Cisterni | 428/326 |

FOREIGN PATENT DOCUMENTS

| | | | |
|---|---|---|---|
| 242665 | 9/1926 | United Kingdom | 264/122 |
| 1362666 | 8/1974 | United Kingdom | 264/122 |

*Primary Examiner*—Jay H. Woo
*Attorney, Agent, or Firm*—Hammond & Littell, Weissenberger and Muserlian

[57] ABSTRACT

Method of producing a stratiform material, wherein 35-45 parts by weight of solvents for polyvinylacetate (PVA) homopolymer in the form of flakes or pearls are stirred with 10-15 parts of PVA and 2-5 parts by weight of oil, while separately mixing 25-30% by weight of wood powder having a granulometry in the range of 50-150 microns and mineral fillers in an amount of 10-20% by weight, then intermixing the liquid and powdery phases to obtain a homogeneous mixture which is passed through calendering rollers, the last pair of which produces an embossing on at least one of the two surfaces, the layer being reduced to a thickness in the range of 0.2-2.0 millimeters.

9 Claims, No Drawings

SHEET MATERIAL FOR GENERAL COVERINGS AND METHOD OF MAKING THE SAME

This patent application relates to a sheet material for general coverings, characterized by being provided by mixing and subsequent lamination of a compound having, as main elements, wood powder, mineral fillers, acetovinyl resin binder and associated solvents.

This invention also relates to a method of preparing said sheet material. This method is characterized by mixing wood powder, mineral fillers, acetovinyl resin and solvents according to the percentages and characteristics hereinafter related, then after mixing, reducing the compound to a thin layer of a thickness ranging between 0.2 and 2.0 millimeters by means of rolling cylinders, at least one of which is provided with a surface capable of producing engravings or embossings representing wood veneering along the path of the layer being formed, then hardening this formed layer by vaporisation of the solvents previously admitted into the composition.

A typical example of a compound according to the present invention is provided with the following ingredients (all the percentages are given by weight both in this and in the successive examples):

| | |
|---|---|
| Solvents for PVA | 39.7% |
| Oil | 4.0% |
| PVA homopolymer (flakes or pearls) | 13.2% |
| Wood powder (having a granulometry of between 50 and 150μ) | 26.5% |
| Mineral fillers | 16.6% |
| | 100.0% |

The above formulation may be varied within rather restricted limits. Particularly, wood powder with dimensions between 50 and 150μ may be in a percentage in the range of 25-30%, acetovinyl resin (homopolymer in flakes or pearls) in a range of 10-15%, and the relevant solvent, or mixture of solvents, in a total percentage of 35-45%. The mineral fillers in the compound according to the invention are in a percentage of 10-20% and oil in a percentage of 2-5%.

The function of the various ingredients and the main characteristics thereof will now be hereinafter explained.

PVA solvents serve the only purpose of dissolving the flakes or pearls of PVA.

Generally, it is preferred to use somewhat volatile solvents to provide a product immediately drying after passing through the last pair of calendering cylinders. Generally, a mixture of acetone and toluene has proved sufficiently inexpensive and suitable for use.

Oil serves to render the mixture antiadhesive with respect to the surface of the calendering rollers. Vaseline oil has proved to be suitable, but it could also be replaced conveniently with silicone oil, although the latter is more costly than the former.

Wood powder is for imparting wood appearance to the compound. Its granulometry is in the range of 50-150μ. For instance, in order to alter the product hardness use, can be made of a kind of wood powder as obtained by very hard or very soft woods.

PVA homopolymer is for binding the wood powder. Depending on the range of softening temperature, acetovinyl resins of various polymerization degrees can be used. By way of example, should the softening range be between 50° and 70° C., a solid homopolymer of polyvinyl acetate having a mean molecular weight of 350 will be used. For other temperature ranges, the following data would be appropriate:

Solid PVA homopolymer (flakes)

| Mean polymerization degree | Softening range (°C.) |
|---|---|
| 1400 | 80–100 |
| 2500 | 105–120 |
| 3000 | 115–130 |

Mineral fillers serve the purpose of filling up the interspaces between the wood particles. Particularly, the use of some percentage of aggregates or inert materials, such as very fine powder of calcium carbonate, has proved advantageous, allowing one to obtain a smooth and poreless surface. This is added with thioxtropic agents, such as kaolinites, enhancing the product stiffness and having the function of reducing the viscosity of the mixture when the latter is subjected to calendering. An improved abrasion resistance feature can be also given to the product by using magnesium silicate instead of calcium carbonate.

The method of fabricating a mixture according to the present invention is as follows.

Component mixing is effected in two successive steps. Wood powder and mineral fillers are dry blended within a kneading machine or mixer, while at the same time and separately polyvinyl acetate has been dissolved in its solvents added with the required amount of oil by stirring the solution in a separate fast stirrer.

Having attained the desired degree of solution (after about 15 minutes at room temperature), the liquid phase is poured into the mixer or kneading machine: after about 20 minutes, the perfect mixing is attained with the provision of a homogeneous mixture. Immediately afterwards, the mixture is admitted into a hopper which through a screw evenly urges the material to the rolling cylinders, so as to obtain a continuous sheet material by calendering.

When the mixture is forced out of the hopper, it encounters a set of pairs of cylinders or rollers, gradually reducing the thickness thereof until such a tickness is attained, that it can be subjected to the final lamination by means of the last calender comprising a pair of rollers of large diameter, at least one of which is an embossing roller. Then, if desired, stamping is carried out, that is the differentiation of wood grains by means of colouring. The final thickness may be in the range of 0.2-2.0 millimeters. After the last calender passage, the material passes through a drying oven, wherein the solvents are removed by evaporation. This oven should have a temperature that firstly depends on the laminate thickness, and then on the output rate of the dry laminate to be obtained. At the outlet of the drying oven the material is dry, but still heat softened and therefore can be readily rolled up.

In the product obtained most of the solvents have been evaporated, whereby the product comprises wood powder, fillers and a low percentage of PVA, and accordingly its appearance closely resembles that of a wood as to opacity, surface colour, reasonable hardness, some rigidity, a good impact strength and is capable of undergoing the same processings that can be effected on veneerings, such as sanding and smoothing, gluing and pressing on suitable carriers, spray or film painting.

With respect to wood sheet veneering, the above product has the advantage of being heat softened: at a temperature in the range of 50°–60° C., the sheet material completely loses its stiffness and can be shaped on any surface. For example, in the production of prefabricated panels for furniture, edges can readily be provided by only one gluing operation.

Resemblance to true wood is surprising. The particles of wood powder substantially located adjacent one another without any discontinuity, give such an appearance to the material surface that it can be taken for wood, both to touch and sight.

Hereinafter, an example of a specific embodiment of the present invention is given:

| | |
|---|---|
| Solvents: Acetone | 26.5% |
| Toluene | 13.2% |
| Vaseline oil | 4.0% |
| Polyvinyl acetate homopolymer (flakes or pearls) | 13.2% |
| Wood powder (granulometry: 50–150μ) | 26.5% |
| Fillers: Inerts (calcium carbonate) | 10.6% |
| Thioxtropic agents (kaolinites) | 6.0% |
| | 100.0% |

Vaseline oil can be replaced with silicone oil, while kaolinites can be partly or even completely replaced with calcium carbonate.

A further exemplary embodiment is that according to which a product can be obtained as having high characteristics of surface hardness and abrasion strength (suitable for working surfaces of kitchens, tables, etc.).

| | |
|---|---|
| Ash wood powder | 30.0% |
| PVA (Vynavil K115) marketed by Montecatini | 10.0% |
| Acetone | 22.5% |
| Toluene | 14.5% |
| Hyperventilated magnesium silicate | 19.3% |
| Silicone oil | 3.7% |
| | 100.0% |

The mixing process is effected as above described, using a more extended time due to the greater "leanness" of the composition.

Calendering is also slower.

In this case, the material has a higher hardness than that of the wood being used, this being due to the paste filled with silicate, which confers a substantial strength to abrasion.

The sheet is heat moldable at higher temperatures (100°–120° C.).

In this case, by suitable embossings and stampings any kind of hard woods can be imitated.

What is claimed is:

1. A method of producing a stratiform material comprising stirring 35–45 parts by weight of solvents, polyvinylacetate homopolymer in the form of flakes or pearls with 10–15 parts of polyvinylacetate and 2–5 parts by weight of oil, separately mixing 25–30% by weight of wood powder having a granulometry in the range of 50–150 microns and mineral fillers in an amount of 10–20% by weight, then intermixing the liquid and powdery phases to obtain a homogeneous mixture which is passed through calendering rollers, the last pair of which produces an embossing on at least one of the two surfaces, the layer being reduced to a thickness in the range of 0.2–2.0 millimeters.

2. A method according to claim 1, wherein from the calendering outlet the product is introduced into an oven.

3. A method according to claim 1, wherein the products obtained are then stamped differentiating the wood veneerings by means of different colouring.

4. A method according to claim 1, wherein the percentages of the various ingredients are as follows:
Solvents: 39.7%
Oil: 4.0%
Polyvinylacetate homopolymer: 13.2%
Wood powder: 26.5%
Mineral fillers: 16.6%

5. A method according to claim 4, wherein the solvents are a mixture of acetone and toluene of 26.5% and 13.2%, respectively.

6. A method according to claim 4, wherein the fillers are a mixture of inert materials in a percentage of 10.6%, and thixotropic agents in a percentage of 6.0%.

7. A process according to claim 1, wherein the percentages of the ingredients are as follows:
Ash wood powder: 30.0%
polyvinylacetate: 10.0%
Acetone: 22.5%
Toluene: 14.5%
Hyperventilated magnesium silicate: 19.3%
Silicone oil: 3.7%

8. A method of claim 6 wherein the inert material is calcium carbonate and the thioxtropic agents are Kaolinites.

9. A sheet material produced by the process of claim 1.

* * * * *